(12) United States Patent
Tanaka et al.

(10) Patent No.: US 7,944,110 B2
(45) Date of Patent: May 17, 2011

(54) STATOR IN ROTATING ELECTRIC MACHINE (75) Inventors: Kazunori Tanaka, Tokyo (JP);
Yukiyoshi Ohnishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/719,130

(22) Filed: Mar. 8, 2010

(65) Prior Publication Data

US 2010/0156233 A1 Jun. 24, 2010

Related U.S. Application Data (62) Division of application No. 10/573,198, filed as application No. PCT/JP2004/010043 on Jul. 14, 2004, now Pat. No. 7,743,483.

(51) Int. Cl.
*H02K 3/487* (2006.01)

(52) U.S. Cl. ........................ 310/215; 310/214

(58) Field of Classification Search .................. 310/214, 310/215, 216.001, 216.067, 216.069, 216.071, 310/216.072, 216.073, 216.074, 216.082, 310/216.105

See application file for complete search history.

(56) References Cited

U.S. PATENT DOCUMENTS

| 1,619,415 A | 3/1927 | Gomory |
| 3,440,197 A | 4/1969 | Boldebuck et al. |
| 3,909,648 A | 9/1975 | Clark |
| 4,400,639 A | 8/1983 | Kobayashi et al. |
| 4,562,164 A * | 12/1985 | Miyazaki et al. ............. 501/151 |
| 4,896,066 A | 1/1990 | Tomite |
| 5,587,619 A | 12/1996 | Yumiyama et al. |
| 5,763,978 A | 6/1998 | Uchida et al. |
| 6,181,038 B1 * | 1/2001 | Van Rooij ..................... 310/89 |
| 6,226,857 B1 | 5/2001 | Becherucci |
| 6,278,213 B1 * | 8/2001 | Bradfield ............... 310/216.069 |
| 6,281,612 B1 * | 8/2001 | Asao et al. .................... 310/179 |
| 6,806,614 B2 | 10/2004 | Kuroyanagi et al. |
| 7,081,697 B2 * | 7/2006 | Neet ...................... 310/216.011 |
| 7,096,566 B2 * | 8/2006 | Du et al. ......................... 29/596 |

FOREIGN PATENT DOCUMENTS

| JP | 60-18648 U | 2/1985 |
| JP | 62-16041 A | 1/1987 |
| JP | 63-93746 U | 6/1988 |
| JP | 2-103754 U | 8/1990 |
| JP | 6-311683 A | 11/1994 |
| JP | 08-051739 A | 2/1996 |
| JP | 09-117087 A | 5/1997 |

(Continued)

*Primary Examiner* — Burton Mullins
*Assistant Examiner* — Naishadh N Desai
(74) *Attorney, Agent, or Firm* — Sughrue Mion, PLLC (57) ABSTRACT

A method of manufacturing a stator in a rotating electric machine. In this method, each slot has a slot peripheral wall and a slot opening, covered with an insulation coating made of an electrical insulation material. The slot peripheral wall SW has a slot bottom wall, a pair of slot side walls opposing to each other and continuing to end portions of the slot bottom wall. The insulation coating is formed continuously from the slot bottom wall to the pair of slot side walls, and a pair of holding grooves opposing to each other is formed in the insulation coating at the vicinity of the slot opening. The groove walls of the pair of the holding grooves are formed in the insulation coating, and an electrical insulation member to close the slot opening is inserted in the pair of holding grooves and held between the pair of holding grooves.

9 Claims, 7 Drawing Sheets

FOREIGN PATENT DOCUMENTS

| | | |
|---|---|---|
| JP | 2000-14068 A | 1/2000 |
| JP | 2000-14069 A | 1/2000 |
| JP | 2003-88021 A | 3/2003 |
| JP | 2003-333784 A | 11/2003 |
| JP | 2004-72899 A | 3/2004 |
| JP | 2004-112856 A | 4/2004 |

* cited by examiner

STATOR IN ROTATING ELECTRIC MACHINE

CROSS REFERENCE TO THE RELATED APPLICATIONS

This application is a Divisional of U.S. patent application Ser. No. 10/573,198, filed Mar. 24, 2006, which is a U.S. National Phase under 35 U.S.C. §371 of International Application PCT/JP04/10043, filed Jul. 14, 2004. The entire disclosure of the prior application, application Ser. No. 10/573,198, is hereby incorporated by reference.

TECHNICAL FIELD

The present invention relates to a stator in a rotating electric machine applied to an AC generator incorporated, for example, into a vehicle to charge an in-vehicle battery and to feed the electric power to other in-vehicle electric loads, and more particularly, to improvements of an insulation structure of stator windings disposed in plural slots of a stator core.

BACKGROUND ART

With an AC generator of this type incorporated into a vehicle, there has been a need for a higher generator output power to meet an increase of electric loads in the vehicle. A stator winding that generates a generator output power therefore tends to be disposed within a slot of the stator core by enhancing space efficiency.

A stator in the rotating electric machine is disclosed, for example, in JP-UM-A-2-103754 (Prior Art 1). According to the stator in the rotating electric machine disclosed in Prior Art 1, plural slots are formed on the inner periphery of the stator core, and a stator winding is disposed within each slot. Two insulation structures are adopted for the stator winding.

One insulation structure is an insulation coating formed on each slot peripheral wall. The slot peripheral wall has a slot bottom wall and a pair of slot side walls opposing to each other, and the slot bottom wall and the pair of slot side walls are formed on the stator core. The insulation coating made of an electrical insulation material is formed on the slot bottom wall and the pair of slot side walls, and the insulation coating electrically isolates the stator winding disposed within the slot from the stator core forming the slot peripheral wall.

The other insulation structure is an electrical insulation member called a wedge for closing a slot opening that opens in the inner peripheral surface of the stator core. The electrical insulation member prevents intrusive substances, such as water, saline water, slurry, and dust, having entered into the rotating electric machine from entering into the slot through the slot opening, and thereby prevents the electric insulation of the stator winding within the slot from being damaged by the intrusive substances. The electrical insulation member is inserted into the slot so as not to fall off with the use of a pair of hanging portions formed on the slot side walls, and closes the slot opening in such a manner that an internal space for disposing the stator winding in the slot will not be reduced excessively.

A stator in the rotating electric machine is also disclosed in JP-A-2000-14068 (Prior Art 2). Prior Art 2 discloses a stator in which an insulation sheet is disposed between the outer periphery of the stator winding disposed within the slot and the stator core forming the slot peripheral wall. The insulation sheet is formed to enclose the outer periphery of the stator winding disposed within the slot.
Patent Document 1: JP-UM-A-2-103754
Patent Document 2: JP-A-2000-14068

DISCLOSURE OF THE INVENTION

Problems that the Invention is to Solve

With the stator disclosed in Prior Art 1, however, the pair of hanging portions for preventing the fall-off of the electrical insulation member is directly formed on the stator core forming the slot side walls. Also, in association with the hanging portions, the insulation coating is formed only to the position near each hanging portion, and a clearance is left between the insulation coating and the hanging portions, through which the stator core is exposed. Hence, when intrusive substances having entered into the rotating electric machine enter into the slot, the intrusive substances enter into the clearance. When the intrusive substances come into contact with both of the stator core forming the slot peripheral wall and the stator winding within the slot to stand astride, electric erosion results in the stator winding. This poses a risk of causing inconveniences that the stator winding is damaged. Because the clearance is a fine gap, it is difficult to remove the intrusive substances once they have entered into the clearance. This poses a significant risk that the stator winding is kept damaged.

When the insulation sheet disclosed in Prior Art 2 is used, it is possible to avoid an event such that the intrusive substances having entered into the rotating electric machine come into contact with both of the stator winding and the slot peripheral wall to stand astride. However, because the stator winding is of a bundle structure in which plural winding members are bundled or a stack structure in which plural winding members are stacked, the workability is poor for the work to enclose the outer periphery of plural winding members of the bundle structure or the stack structure with the insulation sheet, and the workability is also poor for the work to insert the plural winding members enclosed by the insulation sheet into the slot. This countermeasure is therefore impractical.

The invention proposes a stator in a rotating electric machine having an insulation structure improved to reduce these inconveniences.

Means for Solving the Problems

A stator in a rotating electric machine according to the invention is a stator in a rotating electric machine, the stator comprising; a stator core provided with plural slots in an inner peripheral surface: and a stator winding disposed inside each of the plural slots, wherein; each slot of the plural slots has a slot peripheral wall and a slot opening that opens in the inner peripheral surface: the slot peripheral wall of each slot has a slot bottom wall and a pair of slot side walls opposing to each other and continuing to the slot bottom wall: the slot peripheral wall is covered with an insulation coating made of an electrical insulation material: the insulation coating is formed over continuously from the slot bottom wall to the pair of slot side walls: a pair of holding grooves opposing to each other is formed in the insulation coating on the pair of slot side walls at the vicinity of the slot opening: groove walls of the holding grooves in the pair are formed of the insulation coating: and an electrical insulation member for closing the slot opening is inserted into and held between the holding grooves in the pair.

Effects of the Invention

According to the stator in the rotating electric machine according to the invention, the insulation coating covering each slot peripheral wall is formed over continuously from the slot bottom wall to the pair of slot side walls, and the pair of holding grooves opposing to each other is formed in the insulation coating on the pair of slot side walls at the vicinity of the slot opening. Because the groove walls of the holding grooves in the pair are formed in the insulation coating, there is no clearance between the pair of holding grooves and the pair of slot side walls, through which the stator core forming the slot peripheral surface is exposed. It is thus possible to prevent damages on the stator winding caused when intrusive substances enter into such the clearance. In addition, according to the stator according to the invention, the insulation coating covers the slot peripheral wall. The slot peripheral wall can be therefore covered with the insulation coating without the need for a work to enclose the outer periphery of the stator winding with an insulation sheet as in Prior Art 2. The workability can be thus enhanced, which can in turn save the cost.

BEST MODE FOR CARRYING OUT THE INVENTION

Description of Rotating Electric Machine Using Stator according to the Invention Prior to the description of a stator in a rotating electric machine according to the invention, a rotating electric machine to which the stator is applied will be described.

Figure 1:
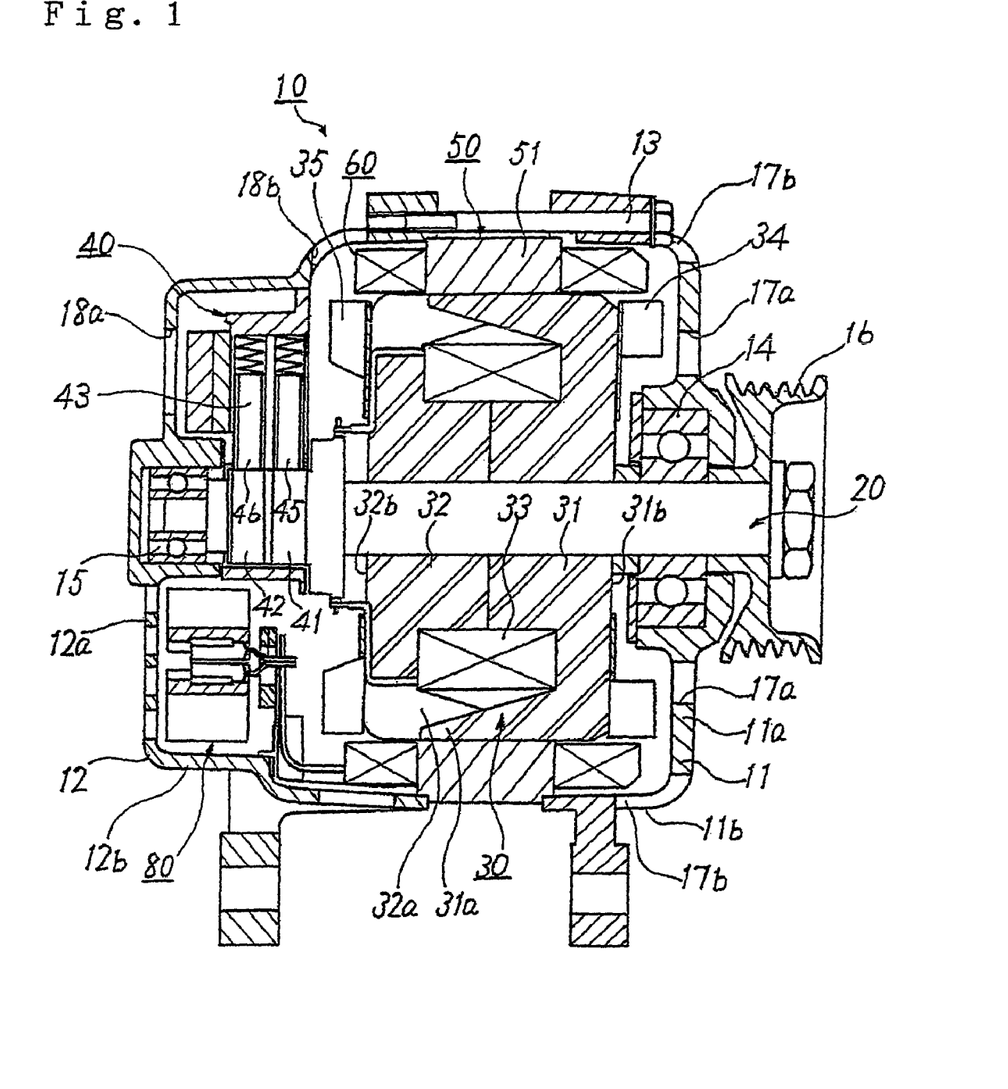
FIG. 1 is a sectional side elevation showing a rotating electric machine to which a stator according to the invention is applied.

FIG. 1 is a sectional side elevation of a rotating electric machine to which the stator according to the invention is applied. The rotating electric machine is an AC generator incorporated into a vehicle, and the AC generator is driven by an in-vehicle engine to charge the in-vehicle battery and to feed the electric power to various electric loads in the vehicle.

The rotating electric machine includes a housing 10, a rotating shaft 20, a rotator 30, an electric power feeding device 40 for the rotator 30, a stator 50, and a rectifier 80.

The housing 10 includes a pair of brackets 11 and 12 opposing to each other. The bracket 11 on the right is referred to as a front bracket and the bracket 12 on the left is referred to as a rear bracket. Both of these front bracket 11 and rear bracket 12 are shaped like a cup, and disposed so that their opening end portions oppose each other.

The front bracket 11 has an end wall 11a and a peripheral wall 11b, and the rear bracket 12 has an end wall 12a and a peripheral wall 12b. These end walls 11a and 12a of the brackets 11 and 12 are on planes that are almost orthogonal to the rotating shaft 20, and the peripheral walls 11b and 12b surround the periphery of the rotating shaft 20. The stator 50 is interposed between the opening end of the peripheral wall 11b of the front bracket 11 and the opening end of the peripheral wall 12b of the rear bracket 12. The stator 50 is held in a space between the brackets 11 and 12 by means of a connecting bolt 13 that connects the brackets 11 and 12 in the axial line direction of the rotating shaft 20.

The rotating shaft 20 penetrates through the central portions of the respective end walls 11a and 12a of the brackets 11 and 12. The rotating shaft 20 is supported rotatably on the respective brackets 11 and 12 via ball bearings 14 and 15. The rotating shaft 20 penetrates through the central portion of the front bracket 11 and extends to the outside of the bracket 11, so that a pulley 16 can be attached to the outside of the bracket 11. The pulley 16 is linked to a crankshaft of the in-vehicle engine by an unillustrated belt, so that the rotating shaft 20 is driven to rotate by the engine.

The respective brackets 11 and 12 are provided with plural airflow openings 17a, 17b, 18a, and 18b. Plural airflow openings 17a are formed in the end wall 11a of the front bracket 11, and plural airflow openings 17b are formed in the peripheral wall 11b. Likewise, plural airflow openings 18a are formed in the end wall 12a of the rear bracket 12, and plural airflow openings 18b are formed in the peripheral wall 12b.

The rotator 30 is attached to the rotating shaft 20 at the central portion. The rotator is a field magnet of the AC generator, and has a pair of field magnet cores 31 and 32 opposing to each other and a field magnet coil 33. The field magnet cores 31 and 32 have protruding magnetic poles 31a and 32a that protrude toward the opposing ends on their outer peripheral portions, and the field magnet coil 33 is disposed on the inner peripheries of these protruding magnetic poles 31a and 32a. The end face 31b of the field magnet core 31 and the end face 32b of the field magnet core 32 oppose each other. A front-end cooling fan 34 and a rear-end cooling fan 35 are attached to the outer periphery of the end face 31b of the field magnet core 31 and the outer periphery of the end face 32b of the field magnet core 32, respectively. These cooling fans 34 and 35 rotate together with the rotating shaft 20 and generate cooling air. The field magnet coil 33, the electric power feeding device 40, the rotator 50, and the rectifier 80 are cooled by the cooling air.

The electric power feeding device 40 and the rectifier 80 are disposed inside the rear bracket 12. The electric power feeding device 40 is an electric power feeding device for the field magnet coil 33, and includes a pair of slip rings 41 and 42 and a brush device 43 for these slip rings. Each of the slip rings 41 and 42 is connected to the field magnet coil 33 and attached to the outer peripheral surface of the rotating shaft 20 so as to rotate together with the rotating shaft 20. The brush device 43 has a pair of brushes 45 and 46. These brushes 45 and 46 are pressed, respectively, against the outer peripheral surfaces of the slip rings 41 and 42 by brush springs, and are thereby brought into contact with these surfaces. A DC voltage from the in-vehicle battery is provided to the brushes 45 and 46, and the field magnet coil 33 is excited by the DC voltage.

The stator 50 has a stator core 51 and a stator winding 60 wound around the stator core 51. The stator 50 is an armature of the AC generator and receives the rotating field magnet magnetic field associated with rotations of the rotator 30. The stator winding 60 generates an AC output voltage using the rotating field magnet magnetic field.

The stator winding 60 is formed as a three-phase winding, and the three-phase stator winding 60 adopts a star connection. The rectifier 80 is connected to the three-phase, star-shaped stator winding 60, and rectifies a three-phase AC output voltage generated in the stator winding 60 to generate a DC output voltage. The rectifier 80 is formed as the three-phase full-wave rectifier, and a DC output voltage therefrom is used to charge the in-vehicle battery and to feed the electric power to various electric loads of the vehicle as well as the field magnet coil 33.

Description of Several Embodiments of Stator in Rotating Electric Machine according to the Invention Subsequently, several embodiments of the stator in the rotating electric machine according to the invention will be described.

First Embodiment

Figure 2:
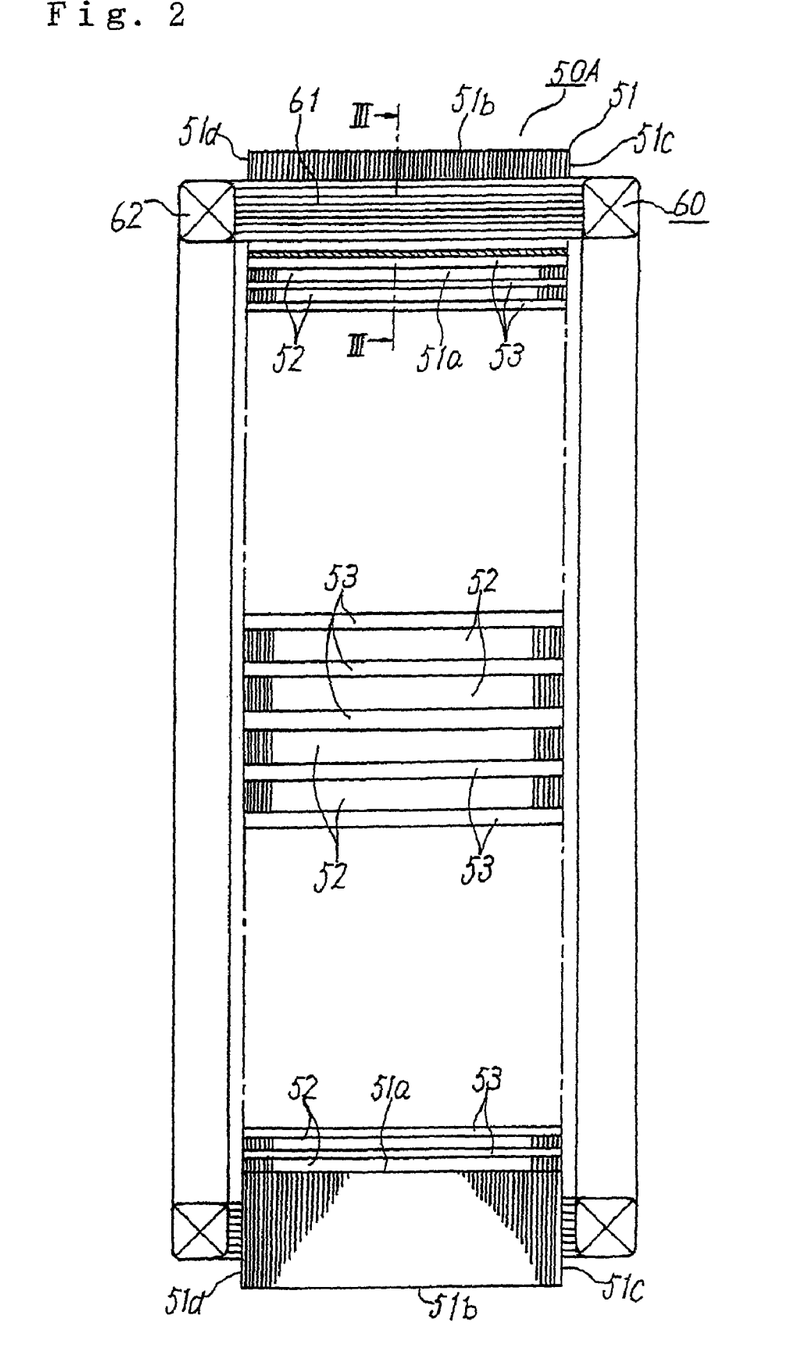
FIG. 2 is a sectional side elevation showing a first embodiment of the stator in the rotating electric machine according to the invention.
Figure 3:
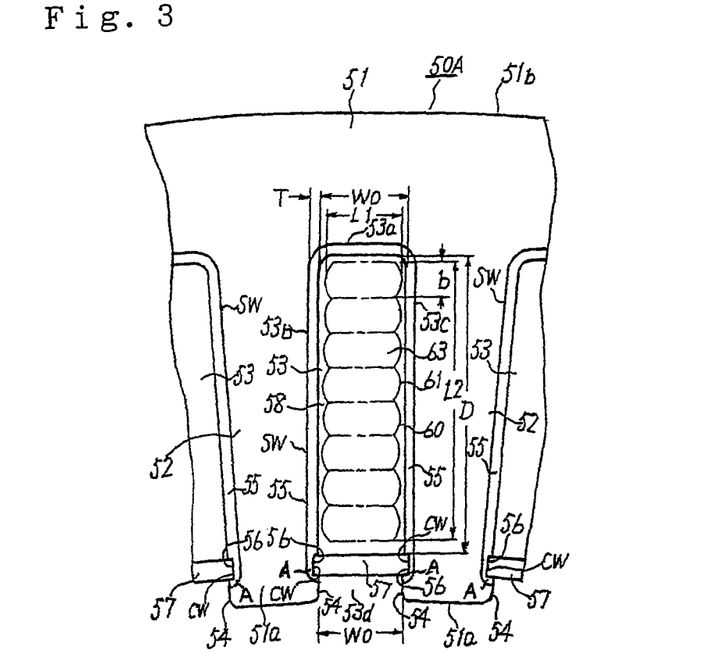
FIG. 3 is a partial enlarged cross section of a portion taken along the line III-III of the stator of the first embodiment.

FIG. 2 is a sectional side elevation showing a first embodiment of the stator in the rotating electric machine according to the invention. FIG. 3 is a partial enlarged cross section taken along the line III-III. The stator of the first embodiment shown in FIG. 2 and FIG. 3 is denoted by a reference numeral 50A, and used as the stator 50 in the rotating electric machine shown in FIG. 1.

As is shown in FIG. 2, the stator core 51 of the stator 50A of the first embodiment is formed in a cylindrical shape, and has an inner peripheral surface 51a, an outer peripheral surface 51b, and a pair of end faces 51c and 51d. The cylindrical stator core 51 is disposed on the periphery of the rotator 30 in such a manner that its axial line coincides with the axial line of the rotating shaft 20. The inner peripheral surface 51a of the stator core 51 is disposed to oppose the outer peripheral surface of the rotator 30 with a fine gap in between. The end face 51c and the end face 51d oppose the end wall 11a of the front bracket 11 and the end wall 12a of the rear bracket 12, respectively. The stator core 51 is formed by layering a number of thin steel plates, such as silicon steel plates, along the axial line of the rotating shaft 20 in a direction from the end face 51c to the end face 51d.

The inner peripheral surface 51a of the stator core 51 is provided with plural teeth 52 and plural slots 53. These plural teeth 52 and plural slots 53 are formed on the inner peripheral surface 51a of the stator core 51 at regular intervals along the circumferential direction. One single slot 53 is formed between every two adjacent teeth 52, and N slots 53 in total are formed on the inner peripheral surface 51a of the stator core 51. In the first embodiment, assume that the number of slots, N, is 36 to 48.

As is shown in FIG. 3, the plural slots 53 are formed so that each has an identical cross section, and the plural teeth 52 are also formed so that each has an identical cross section. Each of the plural teeth 52 and each of the plural slots 53 extend to be almost parallel to the axial line of the stator core 51, and each slot 53 opens in the both end faces 51c and 51d of the stator core 51.

As is shown in FIG. 3, each of the plural slots 53 has a slot bottom wall 53a, a pair of slot side walls 53b and 53c, and a slot opening 53d. The slot bottom wall 53a and the pair of slot side walls 53b and 53c together form a slot peripheral wall SW. The slot peripheral wall SW is formed of the stator core 51. The slot opening 53d opens in the inner peripheral surface 51a of the stator core 51. The slot opening 53d also extends in the axial line direction of the stator core 51, and the both ends thereof open in the end faces 51c and 51d of the stator core 51.

Of the pair of slot side walls 53b and 53c, portions that correspond to the slot opening 53d are provided with hanging portions 54. The hanging portions 54 hang out from the slot side walls 53b and 53c in the pair toward the opposing walls, and the slot opening 53d is formed in between. Let W0 be the width of the slot opening 53d in the circumferential direction. The slot side walls 53b and 53c in the pair oppose each other. The slot side wall 53b and 53c continue to the both end portions of the slot bottom wall 53a and extend onto the hanging portions 54. The slot side walls 53b and 53c in the pair are formed on planes traversing the stator core 51 in almost the radius direction, and extend in the axial line direction of the stator core 51 so that the both ends in the axial line direction continue to the end faces 51c and 51d of the stator core 51.

An insulation coating 55 is formed on each slot peripheral wall SW. The insulation coating 55 is formed on the slot bottom wall 53a and the pair of slot side walls 53b and 53c of each slot 53, thereby covering the slot bottom wall 53a entirely and covering the pair of slot side walls 53b and 53c. The insulation coating 55 has a specific thickness T, and continues from the slot bottom wall 53a to the pair of slot side walls 53b and 53c to cover them over. In particular, it covers over the pair of slot side walls 53b and 53c continuously from the portions adjacent to the slot bottom wall 53a to adjacent portions A adjacent to the hanging portions 54 on the outer peripheral side of the stator core 51. The thickness T of the insulation coating 55 is, for example, 50 to 200 μm.

The insulation coating 55 is made of an electrical insulation material, for example, epoxy resin. The insulation coating 55 is formed on each slot peripheral wall SW by a powder resin spraying method. According to the powder resin spraying method, powder of an electrical insulation material, for example, epoxy resin, is sprayed onto the peripheral wall of each slot 53 while the stator core 51 is kept heated at a specific temperature, and the insulation coating 55 of the specific thickness T is formed as the powder of epoxy resin cures on each slot peripheral wall SW. Because the powder resin spraying method is a known technique, a detailed description thereof is omitted herein.

Figure 4:
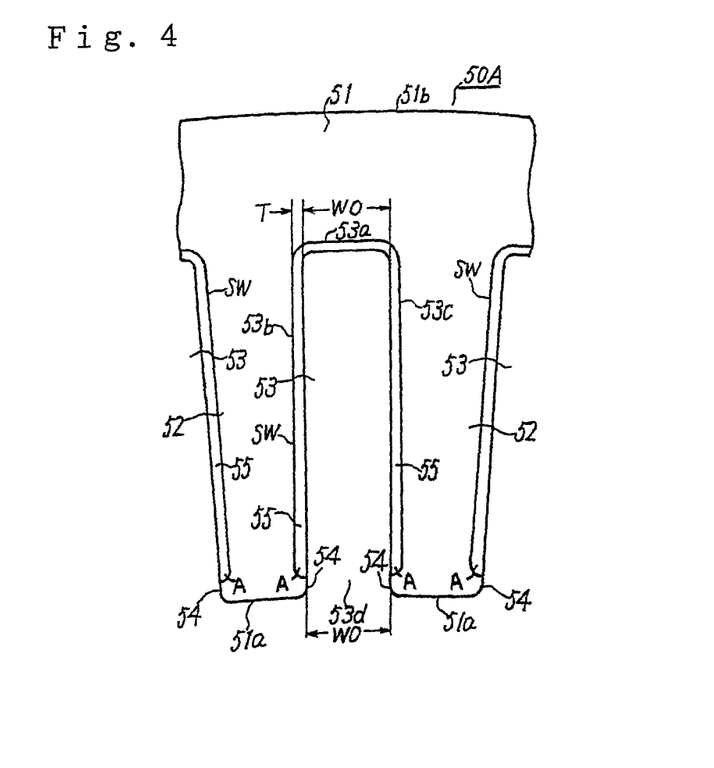
FIG. 4 is a partial enlarged cross section for the stator of the first embodiment showing a state where an insulation coating is formed on a slot peripheral wall.

FIG. 4 is a partial enlarged cross section showing a state where the insulation coating 55 is formed. FIG. 4 is also a partial enlarged cross section taken along the line III-III of FIG. 2. In the first embodiment, subsequent to the formation of the insulation coating 55, a pair of holding grooves 56 is formed in the insulation coating 55 at the adjacent portions A adjacent to the hanging portions 54. The both ends of an electrical insulation member 57 called a wedge are inserted into the pair of holding grooves 56 to stand astride, so that the electrical insulation member 57 is held between the pair of holding grooves 56. The electrical insulation member 57 can be made of various electrical insulation materials, and in the first embodiment, it is made of, for example, polyester resin in the shape of an elongate plate.

The electrical insulation members 57 are prepared in the matching number with the plural slots 53, and each is inserted into and held between the holding grooves 56 in the pair so as to close the slot opening 53d of each slot 53. The electrical insulation member 57 is inserted into the holding grooves 56 in the pair from one of the end faces 51c and 51d of the stator core 51 to reach the other, and thereby closes the slot opening portion 53d. The electrical insulation member 57 prevents intrusive substances, such as water, saline water, slurry, and dust, having entered into the rotating armature from entering into the slot 53 through the slot opening 53d.

In the first embodiment, the pair of holding grooves 56 is formed by cutting out the insulation coating 55. To be more concrete, as is shown in FIG. 4, after the insulation coating 55 is formed on each slot peripheral wall SW, plural cutting-out blades in the matching number with the slots 53 are disposed annularly on the end face 51c side of the stator core 51 to correspond to the slot openings 53d of the respective slots 53, and a cutting blade that cuts out a pair of the holding grooves 56 is formed for each of the plural cutting-out blades. By moving the cutting blades in the axial direction of the stator core 51, the pair of holding grooves 56 is formed in the insulation coating 55 at the adjacent portions A adjacent to the hanging portions 54 on the outer peripheral side.

Figure 5:
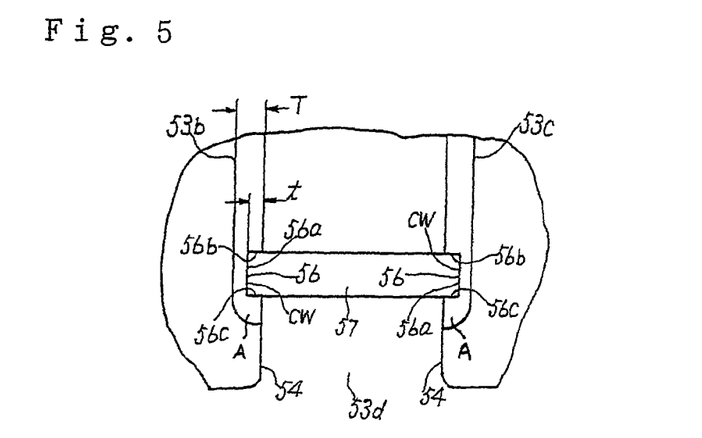
FIG. 5 is a partial enlarged cross section further enlarged to show a portion of holding grooves of the stator of the first embodiment.

Each of holding grooves 56 in the pair has a groove wall CW, and as is shown in further enlarged FIG. 5, each groove wall CW has a groove bottom wall 56a and a pair of groove side walls 56b and 56c opposing to each other in the depth direction of the slot 53. The depth of the groove wall CW, to be more specific, the depth to the groove bottom wall 56a, is assumed to be the depth t from the surface of the insulation coating 55. The depth t of the groove wall CW has a relation, t<T, with the thickness T of the insulation coating 55. For example, given 50 to 200 μm as the thickness T of the insulation coating 55, then the depth t of the groove wall CW is 30 to 170 μm. Because the holding grooves 56 are formed by cutting out the insulation coating 55 to establish the relation, t<T, the groove wall CW is formed in the insulation coating 55. The insulation coating 55 is therefore directly exposed on the groove bottom wall 56a and the pair of groove side walls 56b and 56c of the groove wall CW. Hence, the stator core 51, either in whole or in part, is never exposed to the groove wall CW.

Because each slot peripheral wall SW is covered with the insulation coating 55 and the slot opening 53d is lidded with the electrically insulation member 57, an internal space 58 surrounded by the insulation material is defined inside the slot 53. The internal space 58 has a cross section almost in the shape of a rectangular solid, and D is given as the depth of the radius direction of the stator core 51. The width of the internal space 58 in the circumferential direction remains almost the same from the slot bottom wall 53a side to the holding grooves 56 side. The width in the circumferential direction is almost equal to the width W0 of the slot opening 53d of the slot 53 in the circumferential direction. On the contrary, regarding the respective teeth 52 positioned on the both sides of the slots 53, the width in the circumferential direction becomes smaller gradually from the bottom portion adjacent to the slot bottom wall 53a to the portions adjacent to the holding grooves 56.

The internal space 58 is surrounded entirely by the member made of the electrical insulation material. The outer peripheral wall surface of the inner space 58 is formed of the insulation coating 55 covering the slot bottom wall 53a, and their side wall surfaces are formed of the insulation coating 55 covering the pair of slot side walls 53b and 53c. The inner peripheral wall surface of the internal space 58 is formed of the electrical insulation member 57. Both the groove bottom wall 56a and the pair of groove side walls 56b and 56c of the groove wall CW of each holding groove 56 are formed of the insulation coating 55, which continues to the insulation coating 55 on the pair of slot side walls 53b and 53c. Hence, a space between the electrical insulation member 57 on the inner peripheral side of the internal space 58 and the insulation coating 55 is also covered with the insulation member, and there is no portion through which the stator core 51 is exposed directly. Because the insulation coating 55 on the slot bottom wall 53a also continues to the insulation coating 55 on the pair of slot side walls 53b and 53c on the outer peripheral side of the internal space 58, there is no portion through which the stator core 51 is exposed directly.

The stator winding 60 has an in-slot winding portion 61 disposed within each slot 53 and a coil end portion 62. The stator winding 60 is formed by connecting the in-slot winding portion 61 within each slot 53 through the coil end portion 62. The in-slot winding portion 61 is disposed in the internal space 58 within each slot 53. The in-slot winding portion 61 is formed to have a bundle structure or a stack structure in which plural, for example, eight winding members 63 are combined. The winding member 63 can be insulation-coated wiring materials having various cross sections, and the first embodiment employs the in-slot winding portion 61 of the stack structure in which eight winding members 63, obtained by deforming enamel-coated conducting wires having a circular cross section to be flat, are stacked in line along the pair of slot side walls 53b and 53c of the slot 53. Each of the winding members 63 obtained by deforming enamel-coated conducting wires having a circular cross section to be flat has a width a in the circumferential direction and a thickness b in the radius direction such that a>b.

A width L1 of the in-slot winding portion 61 in the circumferential direction is equal to the width a of a single winding member 63 in the circumferential direction, and the width L1 in the circumferential direction is made slightly smaller than the width W0 of the internal space 58 in the circumferential direction (L1<W0). Also, a thickness L2 of the in-slot winding portion 61 in the radius direction is eight times the thickness b of a single winding member 63 in the radius direction, and the thickness L2 is made slightly smaller than the depth D of the internal space 58 in the radius direction (L2<D).

Because the thickness b of the winding member 63 in the radius direction is smaller than the width a in the circumferential direction, the thickness L2 of the in-slot winding portion 61 in the radius direction is smaller than eight times the width a, and the internal space 58 is expanded in the radius direction. The in-slot winding portion 61 is therefore disposed in the internal space 58 at high space efficiency. The in-slot winding portion 61 is inserted into the internal space 58 through the slot opening 53d before the electrical insulation member 57 is inserted into the holding grooves 56.

In FIG. 3, the in-slot winding portion 61 is shown only in the internal space 58 of the slot 53 at the center. It should be appreciated, however, that it is disposed in any other slot 53 in the same manner. The in-slot winding portion 61 is omitted in FIG. 4, too. The stator winding 60, including plural winding members 63 of the bundle structure or the stack structure, is inserted into each slot 53 after it is molded into a specific shape, such as a waveform, as is shown, for example, in FIG. 6 and FIG. 14 of JP-A-2003-88021.

In the first embodiment, the internal space 58 of the slot 53 is entirely surrounded by the electrical insulation material, and there is no portion through which the stator core 51 is exposed directly. This eliminates the need for a work to enclose the in-slot winding portion 61 with an insulation sheet in advance before it is inserted into the internal space 58 of the slot 53. The workability can be therefore enhanced. Moreover, even when intrusive substances, such as water, saline water, slurry, and dust, enter into the internal space 58, they will not come into contact with the in-slot winding portion 61 and the stator core 51 to stand astride. It is thus possible to prevent damages on the in-slot winding portion 61 caused by electric erosion in a reliable manner.

As an alternative structure in the first embodiment, under grooves may be directly formed in the teeth 52 forming the pair of slot side walls 53b and 53c, so that the pair of slot side walls 53b and 53c provided with the under grooves is covered with the insulation coating and the holding grooves 56 are formed in the insulation coating on the under grooves. In this alternative structure, however, because the under grooves are formed directly in the teeth 52, there arises an inconvenience that magnetic loss of the teeth 52 increases in the under groove portion. In addition, when the insulation coating is formed to cover the under grooves by the powder spraying method, a smooth insulation coating is formed. This causes an inconvenience that the holding grooves 56 are also so smooth that the holding grooves 56 of a specific dimension cannot be formed. The first embodiment can solve the inconveniences caused by the alternative structure by forming the insulation coating 55, and then forming the holding grooves 56 by cutting out the insulation coating 55.

Also, in the first embodiment, the holding grooves 56 are formed in the insulation coating 55 after the insulation coating 55 is formed in the slot 53. Hence, even when the shape of the tip of the teeth 52, or the shape of the hanging portions 54 forming the slot opening 53d is changed, the holding grooves 56 can be formed in the insulation coating 55 regardless of these shapes. In other words, the shape of the teeth 52 is determined by the electromagnetic design of the rotating electric machine; however, the insulation coating 55 can be formed regardless of the shape of the teeth 52 and has a higher degree of freedom in design. It is thus possible to obtain a highly reliable in-slot insulation structure regardless of the electromagnetic design of the rotating electric machine.

Also, in the first embodiment, because the holding grooves 56 are formed in the insulation coating 55, even when the shape of the insulation member 57 is changed, it is sufficient to change the shape of the holding grooves 56 by changing the cut-out shape of the insulation coating 55 in a corresponding manner. There is no need to change the punching pattern of the steel plate as in a case in the related art where the holding grooves are formed directly in teeth. A change in shape of the insulation member 57 can be therefore addressed with ease.

Second Embodiment

Figure 6:
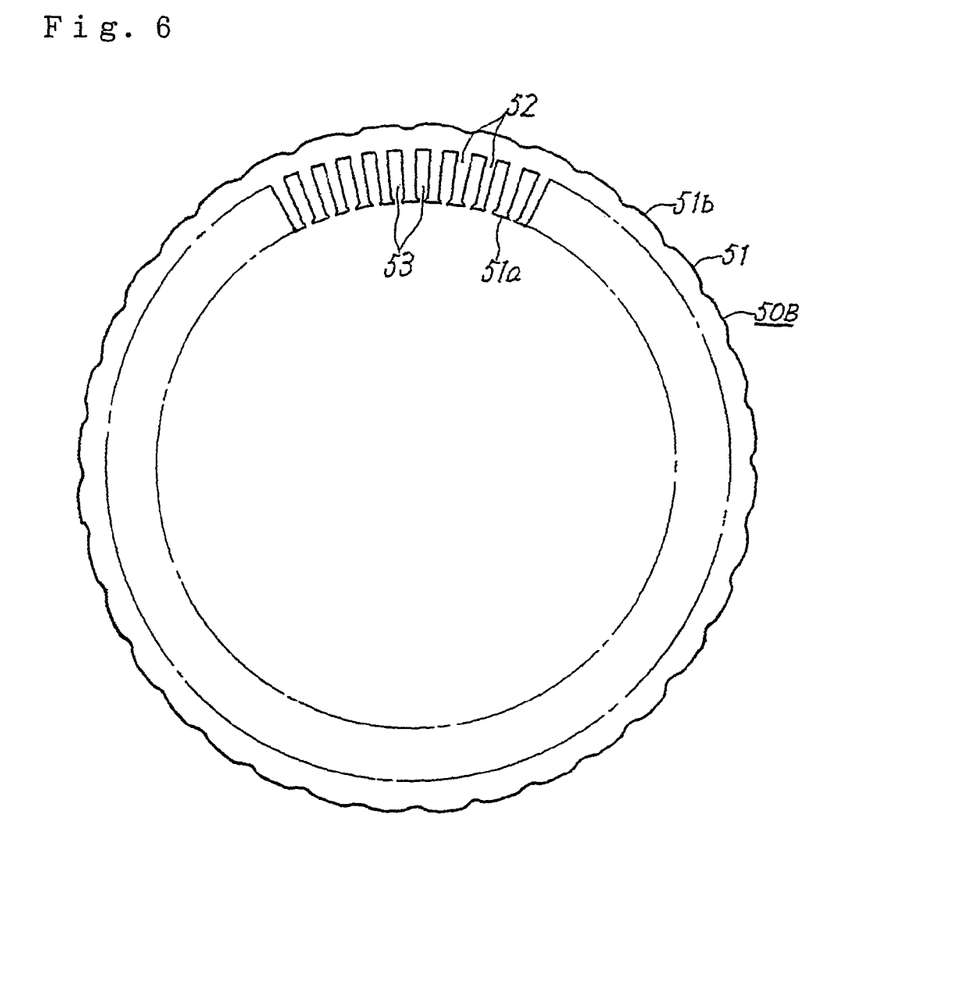
FIG. 6 is a cross section showing a second embodiment of the stator in the rotating electric machine according to the invention.

FIG. 6 is across section showing a stator core in a second embodiment of the stator in the rotating electric machine according to the invention. The stator of the second embodiment is denoted by a reference numeral 50B, and used as the stator 50 of FIG. 1. The stator core 51 of the stator 50B has a larger number of slots, N, than in the first embodiment to address an increase of an output. For example, the number of slots, N, in the first embodiment was 36 to 48, whereas in the second embodiment, the number of slots, N, is increased to 72 to 96 for the stator core 51 of the same inside diameter.

In the second embodiment, in comparison with the first embodiment, the width W0 of the internal space 58 within each slot 53 in the circumferential direction is reduced to about ½, and the width of the respective teeth 52 in the circumferential direction is also reduced to about ½. The other configurations are the same as those in the first embodiment. Although the detailed structure within each slot 53 including the stator winding 60 is omitted from FIG. 6, the configuration is the same as the first embodiment except that the number of slots, N, is increased, and the width of the in-slot winding portion 61 of the stator winding 60 in the circumferential direction is reduced to about ½.

In the second embodiment, the width of the teeth 52 in the circumferential direction is reduced with an increase of the number of slots, N. This makes it difficult to provide sufficient hanging portions 54 at the tips of the teeth 52, which in turn makes it difficult to prevent the insulation member 57 from falling off with the use of the hanging portions 54. However, in the second embodiment, as in the first embodiment, the insulation coating 55 is formed on the pair of side walls 53b and 53c up to the adjacent regions A adjacent to the hanging portions 54, and the holding grooves 56 are formed in the insulation coating 55. The insulation member 57 can be thus held in the holding grooves 56. Hence, even when the hanging dimension of the hanging portions 54 becomes shorter, or should the hanging portions 54 be omitted, the insulation member 57 can be held in a reliable manner. It is thus possible to increase an AC output of the rotating electric machine by increasing the number of slots, N, while ensuring the insulation structure of the stator winding 60 by holding the insulation member 57 in a reliable manner.

Third Embodiment

Figure 7:
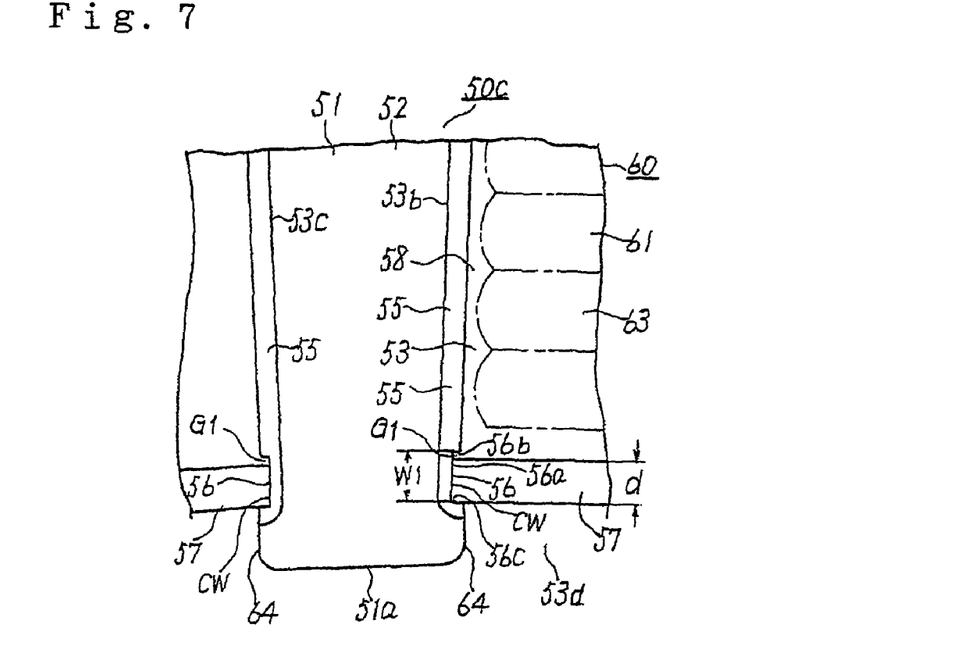
FIG. 7 is a partial enlarged cross section showing a part of a third embodiment of the stator in the rotating electric machine according to the invention.

FIG. 7 is a partial enlarged cross section showing a third embodiment of the stator in the rotating electric machine according to the invention. It is an enlarged cross section of a corresponding portion taken along the line III-III of FIG. 2. The stator of the third embodiment is denoted by a reference numeral 50C, and is used as the stator 50 of FIG. 1.

With the stator 50C of the third embodiment, a gap G1 is formed between the outer-peripheral groove side wall 56b of each holding groove 56 and the electrical insulation member 57 inserted into the holding grooves 56. In other words, a width W1 between the pair of groove side walls 56b and 56c of the holding groove 56 is made slightly larger than a thickness d of the electrical insulation member 57, so that the gap G1 is formed when the electrical insulation member 57 is inserted into the holding grooves 56 and the electrical insulation member 57 is joined to the groove bottom wall 56a and the inner-peripheral groove side wall 56c of the groove wall CW. The other configurations are the same as those in the first embodiment.

According to the third embodiment, not only is it possible to achieve the same effects as those in the first embodiment, but it is also possible to enhance the workability of a work to insert the insulation member 57 because the air gap G1 can absorb displacement of the insulation member 57.

The in-slot winding portion 61 is shown only within the slot 53 on the right in FIG. 7, too. It should be appreciated, however, that it is also disposed in any other slot 53 in the same manner.

Fourth Embodiment

Figure 8:
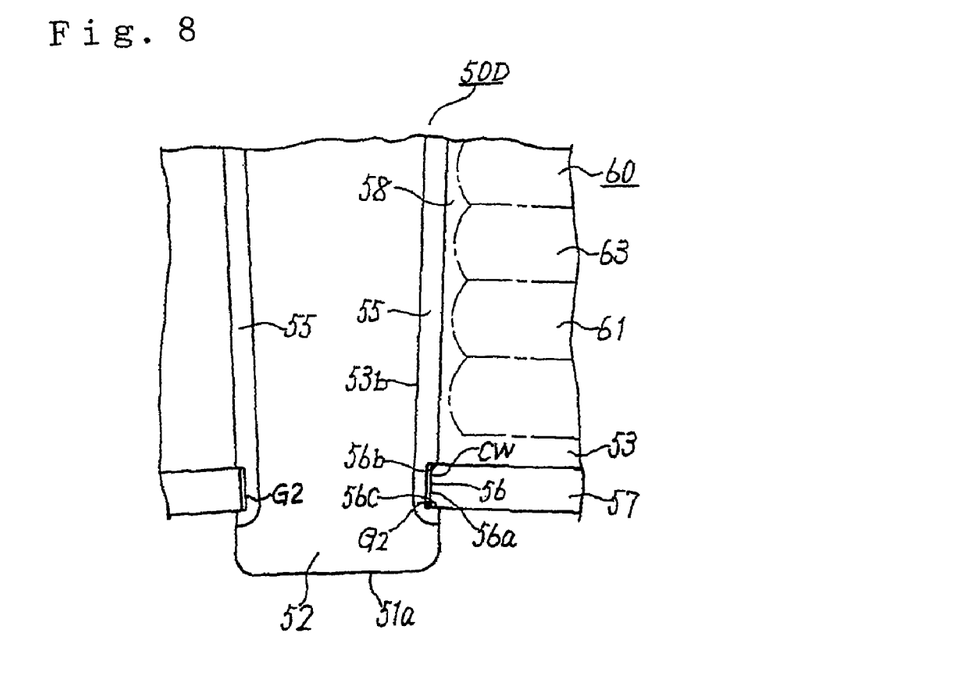
FIG. 8 is a partial enlarged cross section showing a part of a fourth embodiment of the stator in the rotating electric machine according to the invention.

FIG. 8 is a partial enlarged cross section showing a fourth embodiment of the stator in the rotating electric machine according to the invention. It is an enlarged cross section of a corresponding portion taken along the line of FIG. 2. The stator of the fourth embodiment is denoted by a reference numeral 50D, and is used as the stator 50 of FIG. 1.

With the stator 50D of the fourth embodiment, a gap G2 is formed between the groove bottom wall 56a of each holding groove 56 and the outer peripheral surface of the electrical insulation member 57 inserted into the holding grooves 56. In other words, an interval between the groove bottom walls 56a of the pair of holding grooves 56 opposing to each other is made slightly larger than the width of the electrical insulation member 57 in the circumferential direction, so that the gap G2 is formed when the electrical insulation member 57 is inserted into a pair of holding grooves 56. The other configurations are the same as those in the first embodiment.

According to the fourth embodiment, not only is it possible to achieve the same effects as those in the first embodiment, but it is also possible to enhance the workability of a work to insert the insulation member 57 because the gap G2 can absorb displacement of the insulation member 57.

The in-slot winding portion 61 is shown only within the slot 53 on the right in FIG. 8, too. It should be appreciated, however, that it is also disposed in any other slot 53 in the same manner.

Fifth Embodiment

Figure 9:
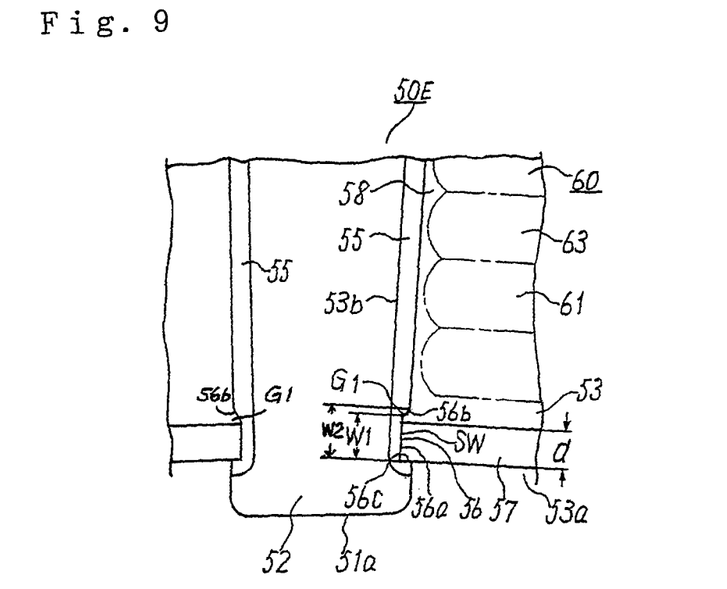
FIG. 9 is a partial enlarged cross section showing a part of a fifth embodiment of the stator in the rotating electric machine according to the invention.

FIG. 9 is a partial enlarged cross section showing a fifth embodiment of the stator in the rotating electric machine according to the invention. It is an enlarged cross section of a corresponding portion taken along the line III-III of FIG. 2. The stator of the fifth embodiment is denoted by a reference numeral 50E, and is used as the stator 50 of FIG. 1.

With the stator 50E of the fifth embodiment, a gap G1 is formed between the outer-peripheral groove side wall 56b of each holding groove 56 and the electrical insulation member inserted into the holding grooves 56 as in the third embodiment. In addition, the outer-peripheral groove side wall 56b of the holding groove 56 is formed to tilt in the depth direction of the slot 53, so that a width W2 of the groove side walls 56b and 56c in the opening of the holding groove 56 is made larger than a width W1 of the groove side walls 56b and 56c at the groove bottom wall 56a. The other configurations are the same as those in the first embodiment.

When the electrical insulation member 57 is inserted into the holding grooves 56, part of the insulation coating 55 may be chipped at the opening of the holding grooves 56, in particular, at the edge of the outer-peripheral groove side wall 56b, and there is a risk that the chip enters into the internal space 58 within the slot 53 and damages the insulation coating of the in-slot winding portion 61. However, in the fifth embodiment, in addition to the configuration of the third embodiment, because the outer-peripheral groove side wall 56b is tilted in the depth direction of the slot 53, the edge portion between the outer-peripheral groove side wall 56b and the inner peripheral surface of the insulation coating 55 produce an obtuse angle. This improves the fall-off of a chip of the insulation coating 55 at the edge portion. It is thus possible to prevent damages on the in-slot winding portion 61 caused by the fall-off of a chip of the insulation coating 55 at the edge portion.

The in-slot winding portion 61 is shown only within the slot 53 on the right in FIG. 9, too. It should be appreciated, however, that it is also disposed in any other slot 53 in the same manner.

Sixth Embodiment

Figure 10:
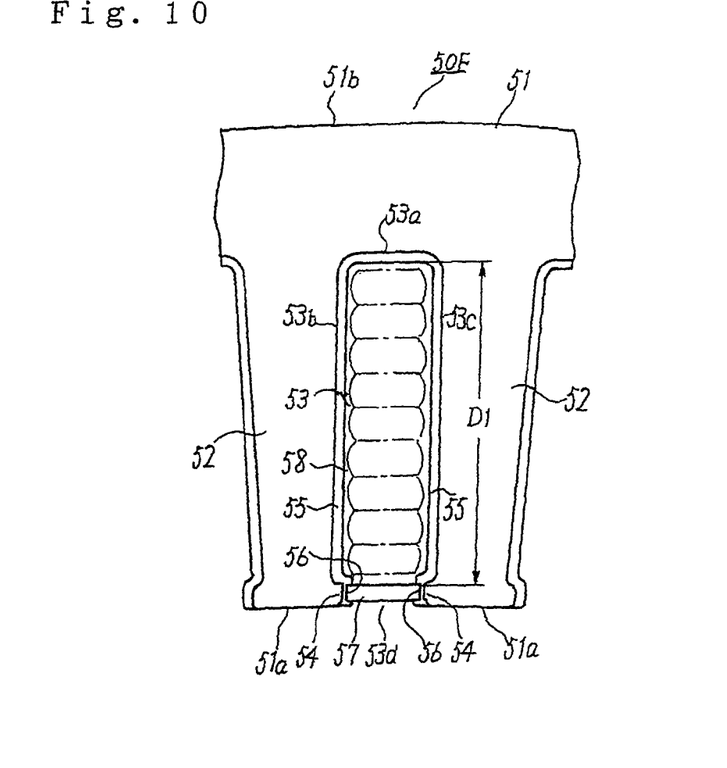
FIG. 10 is a partial enlarged cross section showing a part of a sixth embodiment of the stator in the rotating electric machine according to the invention.

FIG. 10 is a partial enlarged cross section showing a sixth embodiment of the stator in the rotating electric machine according to the invention. It is an enlarged cross section of a corresponding portion taken along the line III-III of FIG. 2. The stator of the sixth embodiment is denoted by a reference numeral 50F, and is used as the stator 50 of FIG. 1.

Figure 11:
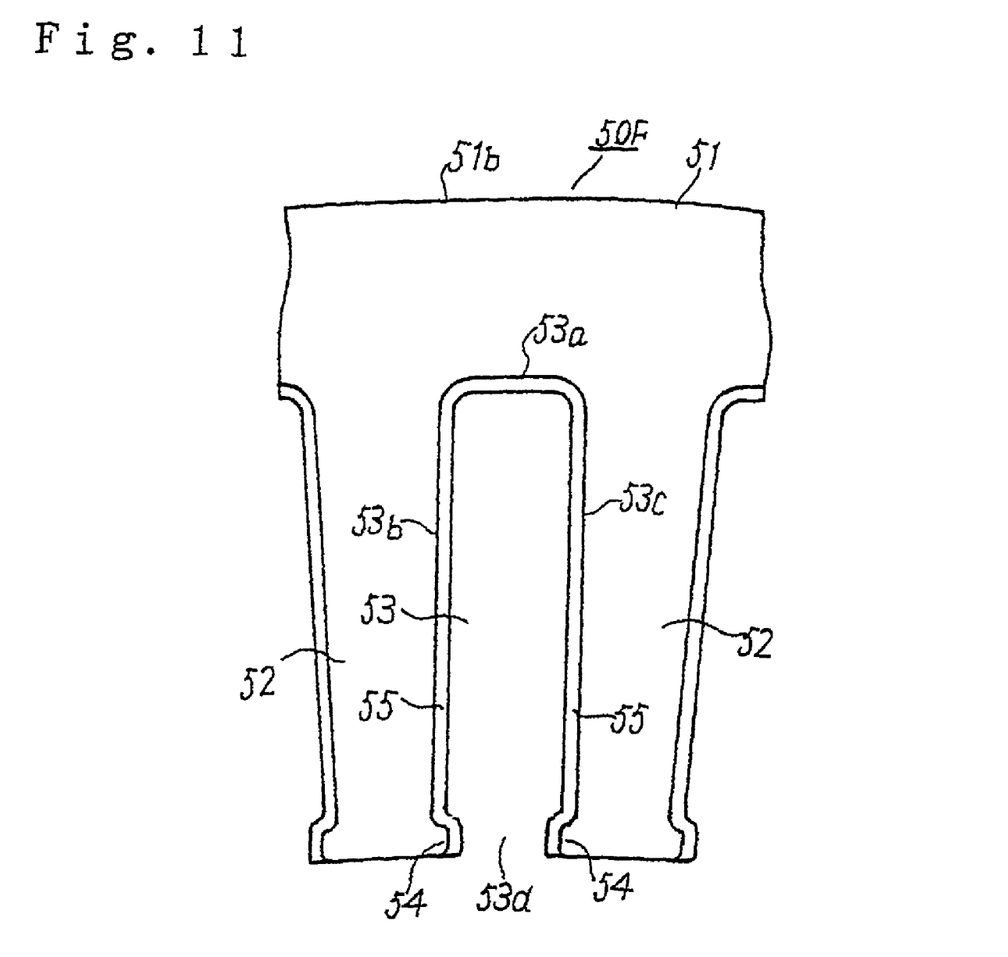
FIG. 11 is a partial enlarged cross section showing a state where an insulation coating is formed on a slot peripheral wall in the sixth embodiment.

With the stator 50F of the sixth embodiment, the insulation coating 55 covers the slot bottom wall 53a of each slot 53 entirely, and it also covers the pair of slot side walls 53b and 53c entirely in each slot 53. To be more specific, as also illustrated in FIG. 11, the insulation coating 55 extends to the crossing portion of the pair of slot side walls 53b and 53c and the inner peripheral surfaces 51a to cover the pair of slot side walls 53b and 53c entirely as well as the hanging portions 54. The holding grooves 56 are formed by cutting out the insulation coating 55 covering the hanging portion 54 in the same manner as in the first embodiment. The other configurations are the same as those in the first embodiment.

According to the sixth embodiment, not only is it possible to achieve the same effects as those of the first embodiment, but it is also possible to increase an AC output by increasing the number of windings of the stator winding 60, because the depth D1 of the internal space 58 in the radius direction can be made larger than the depth D in the first embodiment by forming the holding grooves 56 in the insulation coating 55 covering the hanging portions 54.

In all the first through sixth embodiments above, the electrical insulation member 57 is of a plate shape; however, the electrical insulation member 57 of any other shape, such as a dovetail shape, can be used as well.

INDUSTRIAL APPLICABILITY

The stator in the armature of the invention can be applied to an AC generator that is incorporated, for example, into a vehicle to charge the battery and to feed other loads.

DESCRIPTION OF REFERENCE NUMERALS AND SIGNS 50, 50A, 50B, 50C, 50D, 50E, 50F: stator
51: stator core
51a: inner peripheral surface, 51b: outer peripheral surface, 51c and 51d; end face,
52: teeth
53: slot, 53a: slot bottom wall, 53b and 53c: slot side wall 53d: slot opening, SW: slot peripheral wall,
54: hanging portion,
55: insulation coating
56: holding groove, 56a: groove bottom wall, 56b and 56c: groove side wall, CW: groove wall
57: electrical insulation member,
58: internal space,
60: stator winding
61: in-slot winding portion,
62: coil end portion,
63: winding member
G1 and G2: gap

The invention claimed is:
1. A stator in a rotating electric machine, the stator comprising:
 a stator core formed in a cylindrical shape provided with plural teeth and plural slots on a radial inner circumference of said top end cover between each two adjacent teeth in a peripheral surface; and
 a stator winding disposed inside each of the plural slots, wherein:
 each slot of the plural slots has a slot peripheral wall and a slot opening that opens in the inner peripheral surface;
 the slot peripheral wall of said each slot has a slot bottom wall and a pair of slot side walls opposing to each other and continuing to the slot bottom wall;
 the slot opening is formed between hanging portions hanging out from the pair of slot side walls;
 the slot peripheral wall is covered with an insulation coating made of an electrical insulation material;

the insulation coating is formed over continuously from the slot bottom wall to portions adjacent to the hanging portions at the outer peripheral sides of the hanging portions;

a pair of holding grooves opposing each other are formed in the insulation coating on the pair of slot side walls at vicinity of the slot opening;

groove walls of the pair of holding grooves are formed in the insulation coating;

an electrical insulation member for closing the slot opening is inserted into and held between the pair of holding grooves;

the slot opening has a predetermined width in the circumferential direction;

the insulation coating on the pair of slot side walls forms an internal space with the electrical insulation member and the internal space is surrounded by the insulation coating and the electrical insulation member;

the internal space has a space width in the circumferential direction substantially equal to the predetermined width in an area extended from a portion adjacent to slot bottom wall to a portion adjacent to the holding grooves; and a teeth width of the each tooth is gradually decreased from a bottom portion adjacent to the slot bottom wall toward to a portion adjacent to the holding grooves.

2. The stator in the rotating electric machine according to claim 1,
wherein each of the pair of holding grooves is formed by cutting out the insulation coating on the pair of the slot side walls.

3. The stator in the rotating electric machine according to claim 2,
wherein a depth of each of the pair of holding grooves is smaller than a thickness of the insulation coating.

4. The stator in the rotating electric machine according to claim 1,
wherein each groove wall of the pair of holding grooves has a groove bottom wall and a pair of groove side walls opposing each other,
and the groove bottom wall and the pair of groove side walls are formed in the insulation coating.

5. The stator in the rotating electric machine according to claim 4,
wherein a clearance is formed between one of the pair of groove side walls and the electrical insulation member.

6. The stator in the rotating electric machine according to claim 4,
wherein a clearance is formed between the groove bottom wall and the electrical insulation member.

7. The stator in the rotating electric machine according to claim 4,
wherein the inner one of the pair of groove side walls positioned on an inner side of the each slot is formed to tilt in a depth direction of each slot.

8. The stator in the rotating electric machine according to claim 1,
wherein the stator winding is disposed in the internal space and has a width in a circumferential direction smaller than the space width of the internal space.

9. The stator in the rotating electric machine according to claim 1,
wherein the stator winding includes plural winding members disposed in the internal space,
each of the plural winding members has a width in a circumferential direction smaller than the space width of the internal space and a thickness in a radius direction smaller than the width of the each of plural winding members in the circumferential direction, and
the plural winding members are disposed in line along the pair of slot side walls.

* * * * *